(12) United States Patent
Shin et al.

(10) Patent No.: US 6,905,902 B2
(45) Date of Patent: Jun. 14, 2005

(54) VVA MODE LCD

(75) Inventors: Seong Wook Shin, Kyoungki-do (KR);
Sang Un Choi, Kyoungki-do (KR);
Seung Ho Hong, Kyoungki-do (KR);
Jung Ho Ma, Kyoungki-do (KR)

(73) Assignee: Boe Hydis Technology Co., Ltd., Kyoungki-do (KR)

( * ) Notice: Subject to any disclaimer, the term of this patent is extended or adjusted under 35 U.S.C. 154(b) by 90 days.

(21) Appl. No.: 10/673,066

(22) Filed: Sep. 26, 2003

(65) Prior Publication Data

US 2004/0201790 A1 Oct. 14, 2004

(30) Foreign Application Priority Data

Apr. 8, 2003  (KR) ................ 10-2003-0021857

(51) Int. Cl.⁷ .................. H01L 21/00; G02F 1/1333
(52) U.S. Cl. ................. 438/29; 349/56; 349/84; 349/130
(58) Field of Search ................. 438/22, 29, 30, 438/151; 349/56, 84, 129, 130, 42, 177

(56) References Cited

U.S. PATENT DOCUMENTS

| | | | | |
|---|---|---|---|---|
| 5,610,736 A | * | 3/1997 | Asai .................... | 349/42 |
| 2003/0199114 A1 | * | 10/2003 | Fukagawa ............. | 438/29 |
| 2004/0114092 A1 | * | 6/2004 | Ogishima et al. ...... | 349/177 |
| 2004/0119924 A1 | * | 6/2004 | Takeda et al. ......... | 349/129 |

* cited by examiner

Primary Examiner—Tuan H. Nguiyen
(74) Attorney, Agent, or Firm—Ladas & Parry LLP

(57) ABSTRACT

A VVA mode LCD has a liquid crystal (LC) layer of a negative dielectric anisotropy between lower and upper substrates. A pixel electrode is formed on the lower substrate. A color resin layer is formed on the upper substrate and has a V-shaped valley and jagged valleys, which are perpendicular to and shallower in depth than the V-shaped valley. A counter electrode is formed on the color resin layer and has a V-shaped valley and jagged valleys perpendicular to the V-shaped valleys. A first vertical orientation layer is formed between the pixel electrode and the LC layer. A second vertical orientation layer is formed between the counter electrode and the LC layer. First and second polarizers are attached to the outer and inner faces of the upper and lower substrates, respectively. The polarization axis of each intersects. The jagged valleys are provided to the V-shaped valleys via halftone exposure.

5 Claims, 4 Drawing Sheets

VVA MODE LCD

BACKGROUND OF THE INVENTION

1. Field of the Invention

The present invention relates to a Valley Alignment (VA) mode Liquid Crystal Display (LCD), and more particularly, to a Valley Vertical Alignment (VVA) mode LCD having jagged valleys.

2. Description of the Prior Art

As is well known in the art, a VA mode LCD has been proposed to improve a narrow angular field and a low response speed of a Twisted Nematic (TN) mode LCD. Though not shown, the VA mode LCD has upper and lower substrates, each of which is equipped with a liquid crystal drive electrode, a liquid crystal layer interposed between the upper and lower substrates and having liquid crystal molecules with a negative dielectric anisotropy, vertical orientation layers arranged, respectively, in opposite faces of the upper and lower substrates, and polarizers attached, respectively, to outer faces of the upper and lower substrates. The polarizers have polarization axes which intersect with each other.

The VA mode LCD also has liquid crystal molecules arrayed perpendicularly to the substrate under the influence of the vertical orientation layers to realize a dark screen in relation to the upper and lower polarizers having the perpendicularly intersected polarization axes until an electric field is generated. As an electric field is created between liquid crystal drive electrodes in the upper and lower substrates, the liquid crystal molecules are distorted in which long axes thereof are oriented perpendicular to the direction of the electric field so that light leaks through the distorted liquid crystal molecules to realize a white screen.

However, the VA mode LCD has a drawback that the liquid crystal molecules have a dielectric anisotropy and thus the screen forms different images according to angular fields. For example, before creation of the electric field, the liquid crystal molecules are oriented perpendicular to the substrates to obtain a completely dark screen when seen from the front of the screen. However, light leaks through lateral portions of the screen degrading image quality.

Therefore, in order to compensate quality degradation resulting from the dielectric anisotropy of the liquid crystal molecules, there have been proposed various types of VA mode LCDs, for instance, a Multidomain Vertical Alignment (MVA) mode LCD of Fujitsu.

However, though not shown and described in detail, the MVA mode LCD is provided with liquid crystal drive electrodes in the form of protrusions or slits capable of distorting an electric field, respectively, in upper and lower substrates. As a result, there is a drawback in that one more mask is needed to complicate a fabrication process and increase fabrication cost.

Accordingly, in order to solve these problems, a Valley Vertical Alignment (VVA) mode LCD was filed by the assignee of the invention as Korean Patent Application Serial No. 2002-36490, Jun. 27, 2002, by which a V-shaped valley is formed in a color resin layer to create multiple domains.

FIG. 1 illustrates an arrangement of liquid crystal molecules in a conventional VVA mode LCD, in which the reference numeral 1 indicates a slit or protrusion in a lower substrate, 2 indicates a V-shaped groove or valley in the lower substrate, and 3 indicates liquid crystal molecules.

In the VVA mode LCD, a V-shaped valley is formed in a color resin layer, which is also provided with a counter electrode and a vertical orientation layer formed on the color resin layer.

The VVA mode LCD has an electrode structure, which can cause distortion to an electromagnetic field to form multiple domains thereby reducing optical leak according to angular fields. However, because the V-shaped valley is formed via mask change in formation of the color resin layer, the VVA mode LCD does not require any additional mask and thus does not complicate a fabrication process or increase cost as a result of the additional mask.

In the VVA mode LCD, it is required to orient the liquid crystal molecules to lie perpendicularly to the V-shaped valley in application of current in order to form the multiple domains for improving angular field characteristics. However, in the conventional VVA mode LCD, the symmetric peripheral structure of the V-shaped valley fails to stably orient the liquid crystal molecules perpendicular to the V-shaped valley in application of current. As a result, this obstructs formation of stable multiple domains, thereby causing a problem of image quality degradation thanks to creation of a dislination line 10 as shown in FIG. 1.

SUMMARY OF THE INVENTION

Accordingly, the present invention has been made to solve the above-mentioned problems occurring in the prior art, and an object of the present invention is to provide a VVA mode LCD capable of stably forming multiple domains.

In order to accomplish this object, there is provided a VVA mode LCD comprising: a lower substrate; an upper substrate arranged oppose to the lower substrate to a predetermined space; a liquid crystal layer interposed between the upper and lower substrates and having liquid crystal molecules of a dielectric negative anisotropy; a pixel electrode formed in an inner face of the lower substrate; a color resin layer formed in an inner face of the upper substrate, the color resin layer having a V-shaped valley and jagged valleys formed perpendicularly to the V-shaped valley to a depth shallower than that of the V-shaped valley; a counter electrode formed on the color resin layer having the V-shaped valley and the jagged valleys perpendicular to the V-shaped valley; first and second vertical orientation layers interposed, respectively, between the pixel electrode and the liquid crystal layer and between the counter electrode and the liquid crystal layer; and first and polarizers attached, respectively, to outer faces of the upper and lower substrates and having polarization axes intersecting with each other.

In the VVA mode LCD of the invention, the V-shaped valley is formed to penetrate the color resin layer, and the jagged valleys are formed by removing the color resin layer to a predetermined depth. Preferably, the jagged valleys are formed to a depth of about 10 to 80% in respect to that of the V-shaped valley, a width of about 1 to 20 $\mu$m and a pitch of about 1 to 20 $\mu$m.

In addition, it is preferred that the V-shaped valley including the jagged valleys is formed to the shape of one selected from a group including a cross, a letter X and a bracket.

According to the invention, the jagged valleys are added to the V-shaped valley so that the liquid crystal molecules can be oriented substantially perpendicular to the V-shaped valley, thereby stably forming multiple domains as well as improving image quality.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings.

Figure 1:
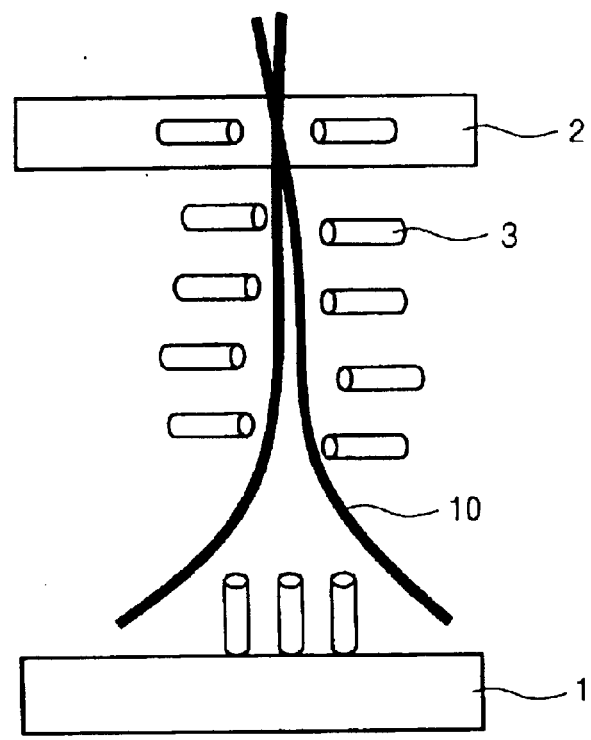
FIG. 1 illustrates an arrangement of liquid crystal molecules in a conventional VVA mode LCD.
Figure 2:
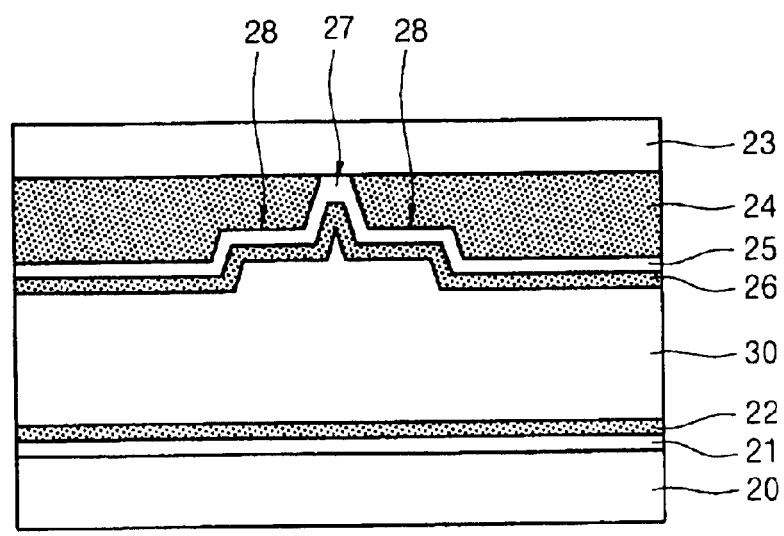
FIG. 2 is a sectional view of a VVA mode LCD of the invention.

FIG. 2 is a sectional view of a Valley Vertical Alignment (VVA) mode LCD of the invention.

As shown in FIG. 2, the VVA mode LCD comprises a lower substrate 20 having a pixel electrode 21, an upper substrate 23 having a counter electrode 25 and a liquid crystal layer 30 interposed between the lower substrate 20 and the upper substrate 23, in which the liquid crystal layer 30 includes a number of liquid crystal molecules having a negative dielectric anisotropy.

A vertical orientation layer 22 is formed in a face of the lower substrate 20 opposed to the upper substrate 23 and a vertical orientation layer 26 is formed in a face of the upper substrate 23 opposed to the lower substrate 20. The vertical orientation layers 22 and 26 function to align the liquid crystal molecules before formation of an electric field. Upper and lower polarizers (not shown) are attached, respectively, to rear faces of the upper and lower substrates 23 and 20 opposite to the vertical orientation layers 26 and 22, in which polarization axes of the upper and lower polarizers intersect with each other.

In particular, the VVA mode LCD of the invention also comprises a color resin layer 24 interposed between the upper substrate 23 and the counter electrode 25. The color resin layer 24 has a V-shaped groove or valley 27 and jagged valleys 28 (only one of them is shown) formed laterally perpendicular to the V-shaped valley 27 to a depth which is shallower than that of the V-shaped valley 27. As a result, the counter electrode 25 and the vertical orientation layer 26 are formed on the color resin layer 24 including the V-shaped valley 27 and the jagged valleys 28.

The V-shaped valley 27 and the jagged valleys 28 can be formed via photomask change and halftone exposure in formation of a Red, Green and Blue (RGB) color resin layer. That is, the V-shaped valley 27 and the jagged valleys 28 can be readily formed without any additional mask by inserting a first mask pattern capable of forming a V-shaped valley into a conventional photomask for formation of the color resin layer and then by arranging a second mask pattern capable of removing a predetermined thickness into the form of a jag perpendicular to the first mask pattern.

For example, where the color resin layer has a thickness of about 1 to 4 μm, the V-shaped valley is formed to a depth of about 1 to 4 μm, and the jagged valleys are formed to a depth of about 10 to 80% in respect to that of the V-shaped valley.

Figure 3:
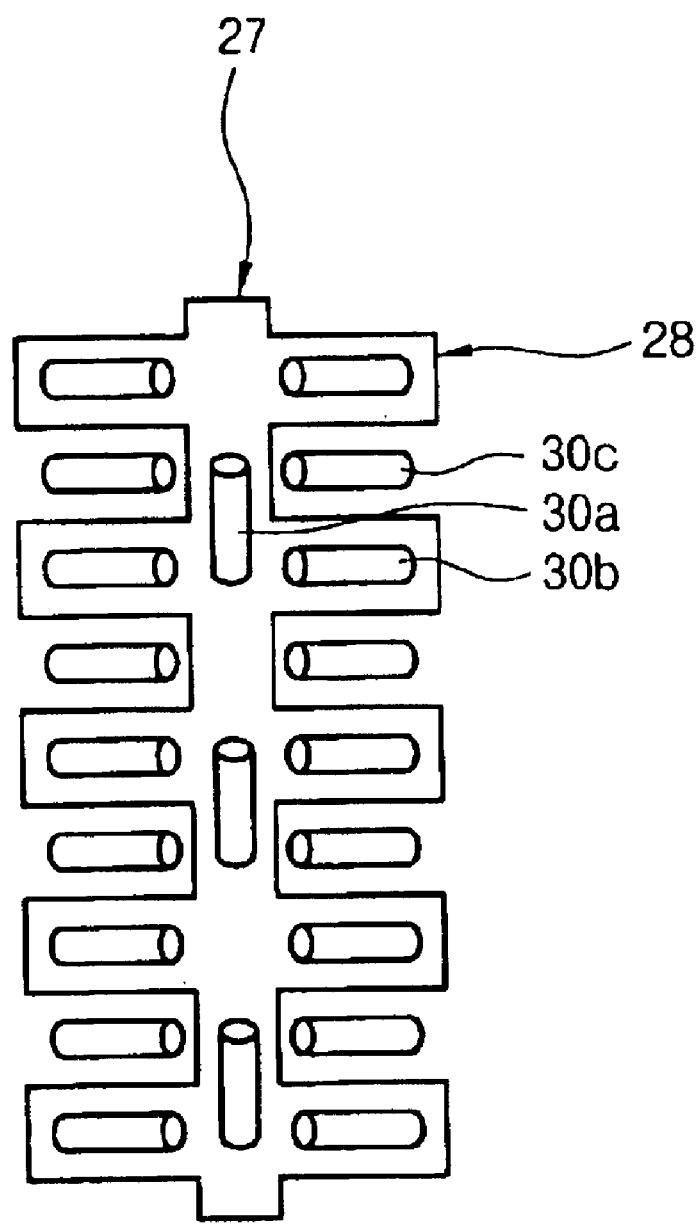
FIG. 3 illustrates an arrangement of liquid crystal molecules in the VVA mode LCD of the invention.

According to the VVA mode LCD having the jagged valleys of the invention, application of current causes liquid crystal molecules 30a within the V-shaped valley to be oriented parallel with the V-shaped valley 27 but liquid crystal molecules 30b within the jagged valleys 28 to be oriented parallel with the jagged valleys 28, that is, perpendicular to the V-shaped valley 27 as shown in FIG. 3. This also causes liquid crystal molecules 30c placed alternatingly with the jagged valleys 28 to be oriented parallel with the jagged valleys 28 according to movement of the liquid crystals 30b within the jagged valleys 28, that is, perpendicular to the V-shaped valley 27.

As a result, the VVA mode LCD of the invention forms jagged valleys to the V-shaped valley so that application of current causes liquid crystal molecules to be oriented perpendicularly to the V-shaped valley. Therefore, multiple domains can be stably formed thereby improving the image quality of the LCD.

In formation of the jagged valleys, it is required to form the valleys to a predetermined width, that is, the minimal size which allows stable movement of the crystal liquid molecules since the width is directly related to opening ratio. For example, the valleys preferably have a width of about 1 to 20 μm and a pitch of about 1 to 20 μm.

Further, the jagged valleys are formed by partially removing the color resin layer in photolithography via halftone exposure. Though the jagged valleys do not act as a factor of decreasing opening ratio, it is preferable to consider the configuration of the jagged valleys in designing a color filter.

Moreover, it is preferred that the jagged valleys are formed to a pitch of about 1 to 20 μm, that is, the maximum size which allows stable movement of the liquid crystal molecules.

In addition, it is preferred that transparent electrode slits or protrusions are formed alternatingly with the V-shaped valleys in a pixel area of the lower substrate in order to ensure the liquid crystal molecules to be uniformly oriented in one direction.

Figure 4A:
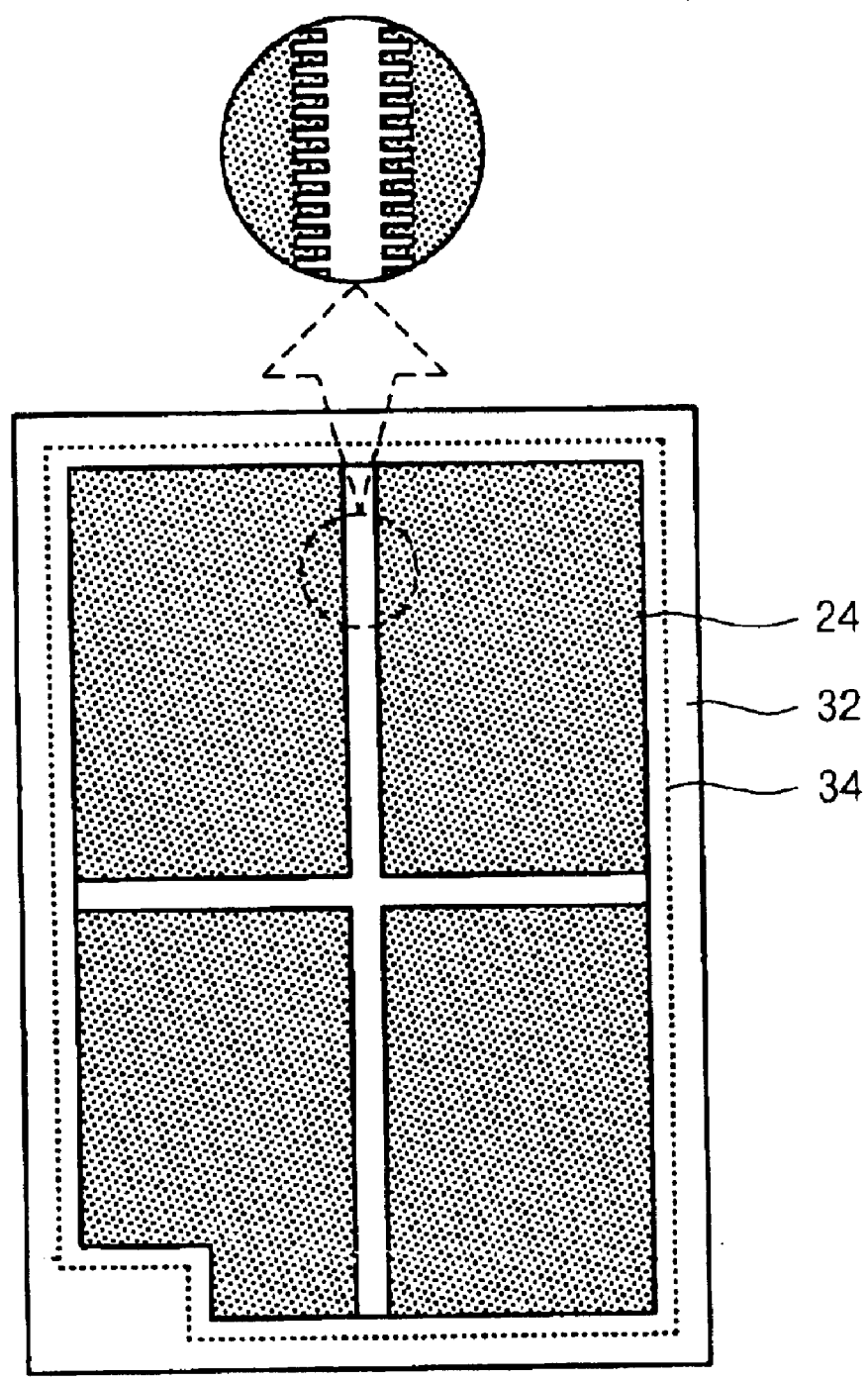
FIGS. 4A through 4C are plan views of pixel structures in the VVA mode LCD of the invention.
Figure 4B:
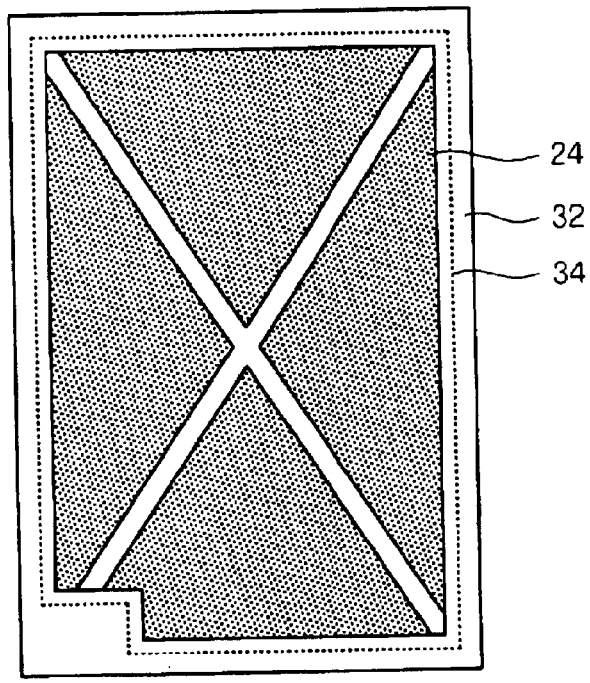
Figure 4C:
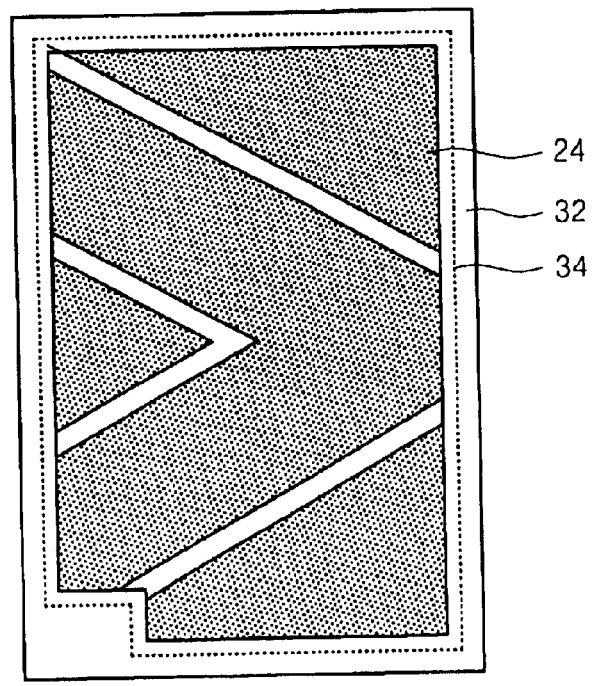

Furthermore, as shown in FIGS. 4A through 4C, V-shaped valleys including jagged valleys are provided in the form of a "cross", "X" and "bracket" to divide the pixel area into at least four regions thereby forming multiple domains which serve to stabilize the orientation of the liquid crystal molecules. A pixel electrode 34 is formed to cover the entire pixel area corresponding to the V-shaped valleys including the jagged valleys. Alternatively, though not shown in the drawings, a plurality of pixel electrodes for example 1 through 4 pixel electrode(s) can be formed so that each of the pixel electrodes can cover only one of the divided regions of the pixel area.

In FIGS. 4A through 4C, the reference numeral 24 indicates a color resin layer, 32 indicates a black matrix, and 34 indicates a pixel electrode.

As set forth above, the present invention provides the jagged valleys to the V-shaped valley via halftone exposure so that the liquid crystal molecules can be oriented substantially perpendicular to the V-shaped valley in application of current to stably form the multiple domains thereby improving the image quality of the VVA LCD. As a result, the present invention enables high-speed response as well as formation of the multiple domains to realize a high definition LCD.

It is to be appreciated that those skilled in the art can variously change or modify the embodiment of the present invention without departing from the scope and spirit of the invention.

What is claimed is:

1. A Vertical Valley Alignment (VVA) mode LCD comprising:

a lower substrate;

an upper substrate arranged oppose to the lower substrate to a predetermined space;

a liquid crystal layer interposed between the upper and lower substrates and having liquid crystal molecules of a dielectric negative anisotropy;

a pixel electrode formed in an inner face of the lower substrate;

a color resin layer formed in an inner face of the upper substrate, the color resin layer having a V-shaped valley and jagged valleys formed perpendicularly to the V-shaped valley to a depth shallower than that of the V-shaped valley;

a counter electrode formed on the color resin layer having the V-shaped valley and the jagged valleys perpendicular to the V-shaped valley;

first and second vertical orientation layers interposed, respectively, between the pixel electrode and the liquid crystal layer and between the counter electrode and the liquid crystal layer; and first and second polarizers attached, respectively, to outer faces of the upper and lower substrates and having polarization axes intersecting with each other.

2. The VVA mode LCD as set forth in claim 1, wherein the V-shaped valley is formed to penetrate the color resin layer, and the jagged valleys are formed by removing the color resin layer to a predetermined depth.

3. The VVA mode LCD as set forth in claim 1, wherein the jagged valleys are formed to a width of about 1 to 20 $\mu$m and a pitch of about 1 to 20 $\mu$m.

4. The VVA mode LCD as set forth in claim 1, wherein the color resin layer is formed to a thickness of about 1 to 4 $\mu$m, and the jagged valleys are formed to a depth of about 10 to 80% in respect to that of the V-shaped valley.

5. The VVA mode LCD as set forth in claim 1, wherein the V-shaped valley including the jagged valleys is formed to the shape of one selected from a group including a cross, a letter X and a bracket.

* * * * *